United States Patent [19]

Oehm

[11] Patent Number: 5,987,451
[45] Date of Patent: Nov. 16, 1999

[54] BIBLE REFERENCE INPUT DEVICE

[76] Inventor: Rainer Albert Oehm, 124 Columbia Heights, Brooklyn, N.Y. 11201

[21] Appl. No.: 08/963,221

[22] Filed: Nov. 3, 1997

[51] Int. Cl.[6] ................................................. A44B 9/10
[52] U.S. Cl. .......................... 707/3; 707/1; 364/709.01; 364/709.16
[58] Field of Search ................ 707/3, 1; 364/709.01, 364/709.16

[56] References Cited

U.S. PATENT DOCUMENTS

| | | | |
|---|---|---|---|
| D. 318,859 | 8/1991 | Hollis | D14/100 |
| D. 356,111 | 3/1995 | Castenada, Jr. | D19/27 |
| 4,445,196 | 4/1984 | Gonet | 364/900 |
| 4,970,680 | 11/1990 | Walters | 364/900 |
| 5,640,552 | 6/1997 | Yianilos | 395/605 |

FOREIGN PATENT DOCUMENTS

| | | | |
|---|---|---|---|
| P1 9700496 | 3/1998 | Brazil . | |
| 2222284 | 2/1990 | United Kingdom | G06F 15/40 |

*Primary Examiner*—Wayne Amsbury
*Assistant Examiner*—Uyen Le

[57] ABSTRACT

An input device that facilitates quick and easy entry of Bible references to look up Bible texts. Most Bible references of the preferred embodiment can be entered with only three keystrokes.

3 Claims, 3 Drawing Sheets

| | |
|---|---|
| L1 | <u>A KEY HAS BEEN PRESSED</u> |
| L2 | RESET 5-SECOND-TIMER |
| L3 | IF KEY = FUNCTION KEY THEN PERFORM PARTICULAR FUNCTION |
| L4 |     DONE |
| L5 | IF KEY = UNDO KEY THEN |
| L6 |     IF STATUS = CHAPTER THEN CHANGE STATUS TO BOOK |
| L7 |     IF STATUS = VERSE THEN CHANGE STATUS TO CHAPTER |
| L8 |     DONE |
| L9 | IF STATUS = BOOK THEN PROCESS BOOK |
| L10 |     CHANGE STATUS TO CHAPTER |
| L11 |     DONE |
| L12 | IF STATUS = CHAPTER THEN PROCESS CHAPTER |
| L13 |     CHANGE STATUS TO VERSE |
| L14 |     DONE |
| L15 | IF STATUS = VERSE THEN PROCESS VERSE |
| L16 |     IF VERSE COMPLETE THEN |
| L17 |         COMPLETE REFERENCE |
| L18 |         CHANGE STATUS TO BOOK |
| L19 |     ELSE SET 2-SECOND-TIMER |
| L20 | IF KEY = ENTER THEN |
| L21 |     CANCEL 2-SECOND TIMER AND COMPLETE REFERENCE |
| L22 |     CHANGE STATUS TO BOOK |
| L23 | DONE |
| | |
| L24 | <u>5-SECOND-TIMER TRIGGERS</u> |
| L25 | CHANGE STATUS TO BOOK |
| L26 | DONE |
| | |
| L27 | <u>2-SECOND-TIMER TRIGGERS</u> |
| L28 | COMPLETE VERSE AND REFERENCE |
| L29 | CHANGE STATUS TO BOOK |
| L30 | DONE |

Fig 3

BIBLE REFERENCE INPUT DEVICE

BACKGROUND—FIELD OF INVENTION

This invention relates to an input device that facilitates quick and easy entry of Bible references.

BACKGROUND—DESCRIPTION OF PRIOR ART

While the Bible has mostly been distributed in book form, there is increasing use of computer-based devices that improve the speed with which a Bible passage can be found. Most of these computer-based devices use a QWERTY keyboard as the input device. The printed Bible and the computer-based Bible suffer from the following disadvantages:

(a) To find a passage in the printed Bible with often more than 1000 pages, the user requires a good knowledge of where each of the 66 books are found.

(b) In the printed Bible, after the book has been found, the chapter and verse have to be located. Such scanning for both chapter and verse numbers often causes an interruption of the thought pattern related to the study material.

(c) Using a computer-based Bible or a personal computer with a QWERTY keyboard, a reference such as 2. Corinthians 15:33 requires 20 keystrokes. The number of keystrokes may be reduced somewhat by enhancing the computer program to allow for abbreviations, such as 2. Cor. 15:33.

(d) Using a computer-based Bible or a personal computer with a QWERTY keyboard, much attention must be given to the syntax of the reference, such as spaces between the book and the chapter and the colon between the chapter and verse.

(e) Using a computer-based Bible or a personal computer with a conventional keyboard, proper spelling of the Bible book is vital.

(f) Many people find computer keyboards overwhelming and difficult to master, and therefore are reluctant to use them.

OBJECTS AND ADVANTAGES

Several objects and advantages of the present patent are:

(a) This invention simplifies the entry of Bible references substantially.

(b) It speeds up the entry of a reference by reducing the number of keystrokes. In the preferred embodiment, a Bible reference requires only three keystrokes on the average. When compared to the above example of 2. Corinthians 15:33, this invention results in a reduction of keystrokes by 85%.

(c) It eliminates the need to spell Bible books correctly.

(d) This invention lends itself to usage by handicapped and near-illiterate people.

(e) By adding an overlay with symbols of the Braille Alphabet, blind people are able to learn the Bible Reference Input Device layout much faster than the layout of a QWERTY keyboard.

Further objects and advantages of this invention will become apparent from a consideration of the drawings and ensuing description.

DRAWING FIGURES

FIG. 3 shows a generalized algorithm of the computing device.

REFERENCE NUMERALS IN DRAWINGS

| | |
|---|---|
| A | Undo Key |
| B1 to B66 | Bible Book/Chapter/Verse Keys |
| C67 to C100 | Custom/Chapter/Verse Keys |
| D | Prefix Key for Chapter and Verse Numbers Above 100 |
| E | Verse Range Key |
| F | Chapter Range Key |
| G1 to G5 | Auxiliary Function Keys |
| H | Enter Key |
| L1 to L30 | Algorithm |

Summary

An input device that facilitates quick and easy entry of Bible references for looking up Bible texts. It consists of a minimum of 66 keys, one for each book of the Bible. In addition, it provides for computer-controlled intelligent entry of chapters and verses.

Figure 1:
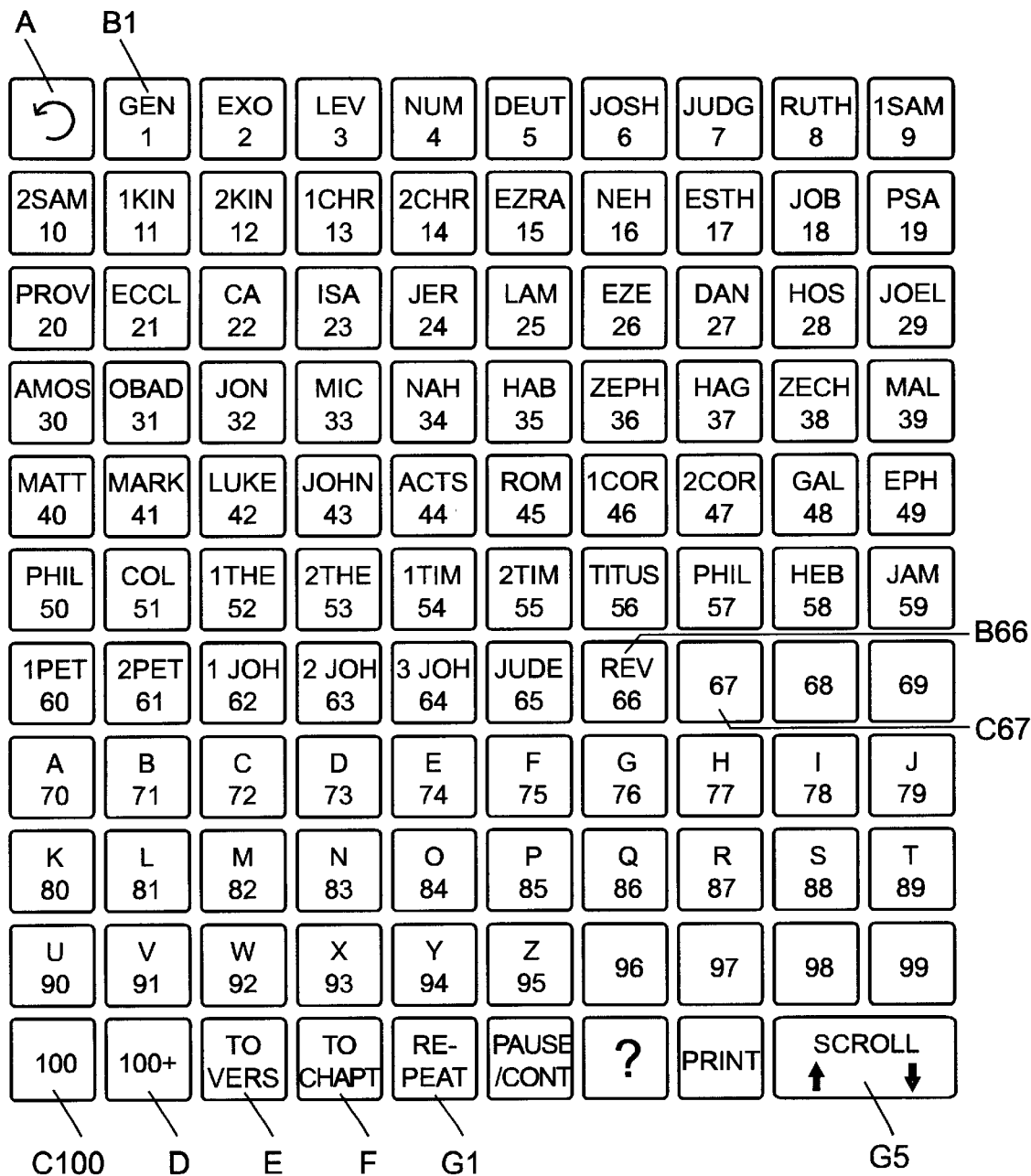
FIG. 1 shows the preferred embodiment of the Bible Reference Input Device.

Description—Preferred Embodiment—FIG. 1

A typical embodiment of the Bible Reference Input Device invention is illustrated in FIG. 1 as a top view with the following keys and key groups:

A Undo Key

On the top left is Undo Key A. It allows for reentering incorrect entries and/or recalling previous Bible references.

B1 to B66 Book/Chapter/Verse Keys

The first group of keys consisting of 66 Bible Book/Chapter/Verse Keys B1 to B66 start to the right of Undo Key A. These keys have two legends, namely the Bible book and a number used for chapter or verse entry. The Bible book legend can be an abbreviation or the complete name. The book name matches the number legend, in that Genesis is book number one and Revelation is book number 66. Pressing any one of these keys can be interpreted by the input device as either a Bible book, chapter or verse. To facilitate finding the chapter and verse numbers, the number matrix is arranged in such a way that the rightmost digits of the numbers are the same in each vertical column. Another feature of Book/Chapter/Verse Keys B1 to B66 is the fact that the so-called Old Testament finishes at the end of the fourth horizontal line, and that the so-called New Testament starts with Matthew at the beginning of the fifth horizontal line. For easier identification, the various groups of keys may be colored differently.

C67 to C100 Custom/Chapter/Verse Keys

The next group of keys are Custom/Chapter/Verse Keys C67 to C100. These keys differ from Book/Chapter/Verse Keys B1 to B66 in that they do not have Bible books but still have chapters and verses. The Bible books may be replaced, depending on the implementation, with a variety of custom features, such as:

(a) The alphabet (b) QWERTY keyboard simulation (c) Bible subjects, such as Faith, Marriage or God (d) Programmable sequences of scripture passages for Bible presentations

D Prefix Key for Chapter and Verse Numbers Above 100

This key permits the entry of chapters and verses above 100. Press this key first and then press the desired chapter or verse minus 100. This arrangement adds one or two keys per reference. However, its use is limited to a relatively small number of Bible passages in Psalms.

E Verse Range Key

This key is used to establish a range of several verses.

F Chapter Range Key

This key is used to establish a range of one or several chapters.

G1 to G5 Auxiliary Function Keys

This group of function keys perform operations, such as Repeat, Pause/Continue, Help, Next Verse and Previous Verse.

Operation—Preferred Embodiment—FIG. 1

An embodiment of the Bible Reference Input Device is illustrated in FIG. 1. In general terms, a Bible reference is entered by pressing a key for a book, a chapter and a verse. With this embodiment, at times this may result in all three keystrokes of the very same physical key, as in Deuteronomy 5:5.

Subsequently, other functions can be performed, of which the most common are listed as follows:

(a) establish a range of verses, such as 1. Corinthians 15:33 to 35

(b) establish a range of chapters, such as 1. Corinthians 15 to 17

(c) skip to next verse or previous verse (d) pause and continue (e) get help

Detailed Description for Entering a Bible Reference Using the Preferred Embodiment Book The user presses one of 66 Bible Book/Chapter/Verse Keys B1 to B66. Optionally, the device attached to the Bible Reference Input Device can either display and/or audibly reproduce the following two things:

(a) the Bible book that was just selected (b) the range of chapters available in the particular Bible book If a mistake was made, Undo Key A can be pressed and the Bible book can be reselected.

Chapter

The user presses a Bible chapter key in one of the following three ways:

(a) If chapter 1 to 66: press Bible Book/Chapter/Verse Keys B1 to B66

(b) If chapter 67 to 100: press Custom/Chapter/Verse Keys C67 to C100

(c) If chapter above 100 (Psalm 101 to 150 only): press Prefix Key for Chapter and Verse Numbers Above 100 D, followed by Bible Book/Chapter/Verse Keys B1 to B66 in the range of 1 to 50. The formula for entry of the last key is: desired chapter minus 100.

(d) The Bible books Obadiah, Philemon, 2. John, 3. John and Jude do not have a chapter. Therefore, the input device will interpret any keystroke as a verse.

Optionally, the device attached to the Bible Reference Input Device can either display and/or audibly reproduce the following two things:

(a) the chapter that was just selected (b) range of verses available in the particular chapter.

If a mistake was made, Undo Key A can be pressed and the chapter can be reselected.

If no chapter entry is made for approximately five seconds, the next keystroke will be interpreted as a Bible book as part of the next Bible reference.

Verse

The user presses a Bible verse key in one of the following three ways:

(a) If verse 1 to 66: press Bible Book/Chapter/Verse Keys B1 to B66

(b) If verse 67 to 100: press Custom/Chapter/Verse Keys C67 to C100

(c) If verse above 100 (Psalm 119:101 to 176) press Prefix Key for Chapter and Verse Numbers Above 100 D, followed by Bible Book/Chapter/Verse Keys B1 to B66 or Custom/Chapter/Verse Keys C67 to C100 in the range of 1 to 76. The formula for entry of the last key is: desired verse minus 100.

Optionally, the device attached to the Bible Reference Input Device can either display and/or audibly reproduce the name of the verse just selected.

If a mistake was made, Undo Key A can be pressed and the verse can be reselected. If no verse entry is made for about five seconds, the next keystroke will be interpreted as a Bible book as part of the next Bible reference.

This concludes entry of a Bible reference. The selected passage can now be displayed or audibly reproduced by the device attached to the Bible Reference Input Device. The subsequent keystroke that would be part of a new Bible reference would be interpreted as a book and the whole cycle would start over again.

Establishing a Range of Verses

Verse Range Key E is used after the initial reference has been established. It is followed by the last verse in the range. As an example, to identify Matthew 6:9 to 13, the following keys would be entered:

Matthew, 6, 9, Verse Range Key, 13.

Establishing a Range of Chapters

Chapter Range Key F is used after the initial reference has been established. It is followed by the last chapter in the range. As an example, to identify Psalm 23 and 24, the following key would be entered:

Psalm, 23, Chapter Range Key, 24.

Figure 2:
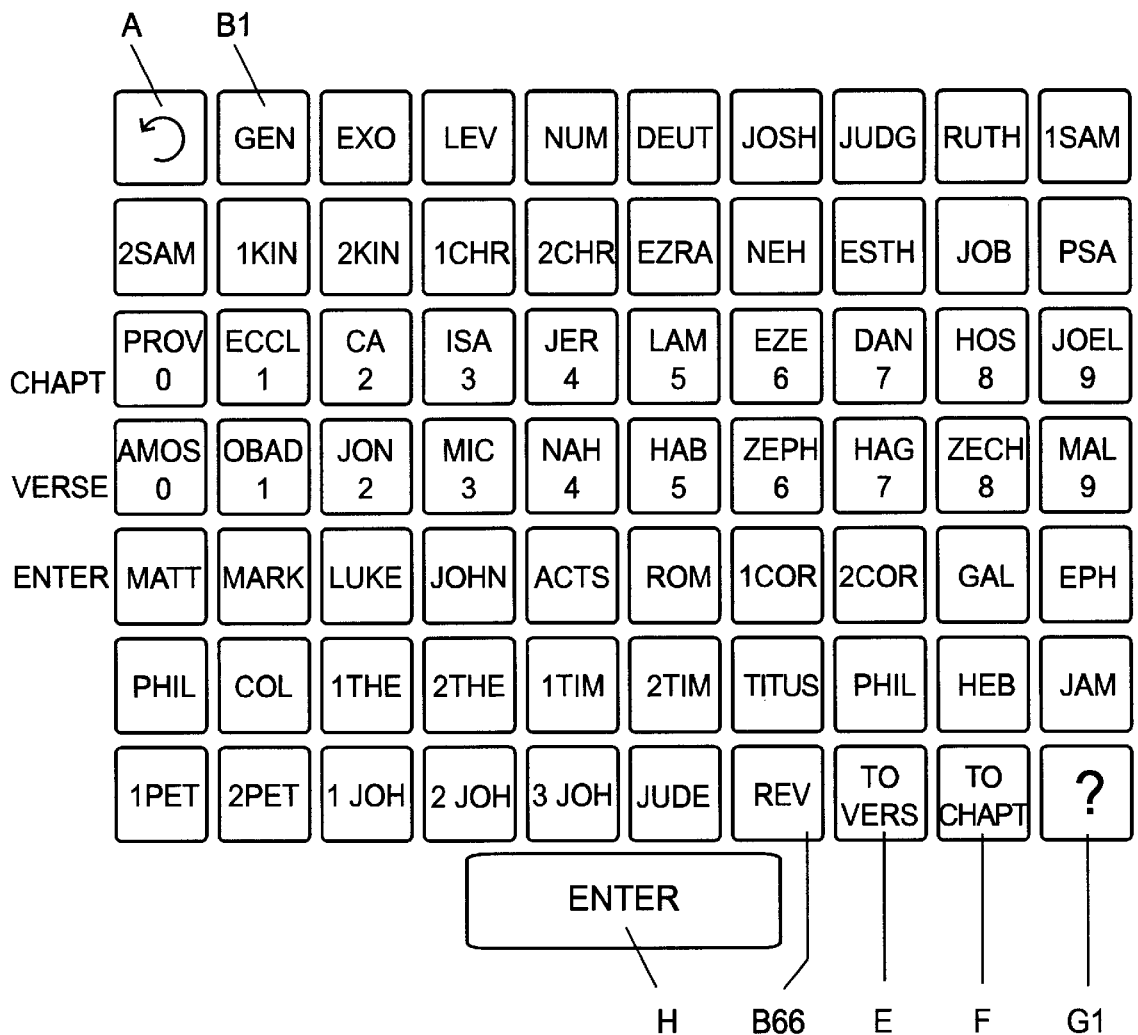
FIG. 2 shows an alternate embodiment of the Bible Reference Input Device.

Description—Alternate Embodiment—FIG. 2

The alternate embodiment shown in FIG. 2 has at least 30 fewer keys than the preferred embodiment illustrated in FIG. 1. The alternate embodiment has the same key arrangement for entering Bible books, but differs in the way chapter and verse keys are arranged. All chapter and verse keys have to be entered as individual digits, requiring from one to three keystrokes each. Therefore, it does not require Prefix Key for Chapter and Verse Numbers Above 100 D. The chapter keys are found as a second level on the third row of keys from the top and the verse keys on the fourth row.

The alternate embodiment may contain Enter Key 24 or an Enter function on all the keys of the fifth row from the top to indicate to the input device that no further verse digits will be entered. If a Bible book does not require a chapter the verse can be entered on either row three or row four.

Operation—Alternate Embodiment—FIG. 2

The alternate embodiment of this invention handles the entry of chapters and verses differently from the preferred embodiment. Each digit of the chapter is entered separately on the third line from the top. This can require one to three keystrokes. Once the digits for the chapter are entered on line three, the user then enters the digits for the verse on line four. Again, this can require one to three keystrokes. After having entered digits on row three and now starting to use row four clearly indicates to the input device that no further chapter digits will be entered. However, after completing a verse keystroke it is not always clear if further keystrokes will follow. For example, 1. Corinthians 15:3 and 1. Corinthians 15:33 are both valid Bible references. This invention solves this problem in three ways:

(a) Bible Structure: The input device determines if further keystrokes can be expected. For example, after entering Matthew 6:33, no further keystrokes can be expected as Matthew 6 has only 34 verses, requiring only two digits.

(b) Enter Key: Press Enter Key H or any key of the fifth row to indicate that no other verse keys will be entered for the current Bible reference.

(c) Time Out: If no further key is pressed for approximately two seconds, the input device interprets the current reference as complete. Subsequent keystrokes will be interpreted as part of a new Bible reference.

Description—Computing Device Algorithm—FIG. 3

FIG. 3 provides a generalized algorithm that is performed by a conventional computing device as part of the Bible Reference Input Device. Algorithm L1 to L23 describe the algorithm that is executed when a key is pressed. The algorithm identifies the key pressed and then executes the appropriate function. In algorithm L3 appears the variable KEY for the first time. This variable contains the key that has just been entered resulting from a keystroke. In algorithm L6 appears an important variable called STATUS. A Bible reference keystroke is interpreted according to the contents of the variable STATUS. It contains one of three values, as follows:

(a) BOOK, when a Bible reference keystroke is interpreted as a Bible book (b) CHAPTER, when a Bible reference keystroke is interpreted as a chapter (b) VERSE, when a Bible reference keystroke is interpreted as a Bible verse.

The above three states controlled by the variable STATUS, and the fact that the states are changed automatically according to the algorithm described in algorithm L1 to L23, are important aspects of this invention.

Algorithm L24 to L26 list the algorithm executed at the end of approximately five seconds after the 5-second timer has been set. The purpose of this timer is to return the Bible reference device to the default state in which most keystrokes are interpreted as Bible books.

Algorithm L27 to L30 list the algorithm executed at the end of approximately two seconds after the 2-second timer has been set. The purpose of this timer is to provide a time limit, after which the input device assumes that there are no further verse digits to be entered. This timer is used only in the alternate embodiment.

Conclusion, Ramifications and Scope

Accordingly, the Bible Reference Input Device facilitates quick and easy entry of Bible references. Most Bible references of the preferred embodiment can be entered with only three keystrokes on the average. It eliminates the need to spell Bible books correctly. This invention lends itself to usage by handicapped and near-illiterate people. By adding an overlay with symbols of the Braille Alphabet, blind people are able to learn the Bible Reference Input Device layout much faster than the layout of a QWERTY keyboard.

The Bible Reference Input Device may be used as an integral part of a device or in conjunction with other devices, such as an attachment to a personal computer that visually and/or audibly reproduces the selected Bible text.

Although the description above contains many specificities, these should not be construed as limiting the scope of the invention, but as merely providing an illustration of the presently preferred and alternate embodiment. Thus, the scope of the invention should be determined by the appended claims and their legal equivalents, rather than the examples given.

I claim:

1. A Bible Reference Input Device, comprising:

(a) A plurality of legends and corresponding keys whereby the Bible book, chapter and verse references share said keys;

(b) A conventional computational means which automatically interprets the first keystroke of a Bible reference as Bible book and the subsequent keystrokes as Bible chapters and/or verses.

2. A method of referencing a Bible input device including:

(a) entering commands on said Bible input device which comprises a plurality of legends and corresponding keys whereby the Bible book, chapter and verse references share said keys;

(b) interpreting the first keystroke as Bible book and the subsequent keystrokes as Bible chapters and/or verses.

3. A computer readable storage product for causing conventional computational means to accept commands on a Bible input device comprising a plurality of legends and corresponding keys whereby the Bible book, chapter and verse references share said keys; and to interpret the first keystroke as Bible book and the subsequent keystrokes as Bible chapters and/or verses.

* * * * *